(12) United States Patent
Song et al.

(10) Patent No.: US 10,890,347 B2
(45) Date of Patent: Jan. 12, 2021

(54) METHOD AND DEVICE FOR CONTROLLING AIR CONDITIONER

(71) Applicant: Qingdao Haier Air Conditioner General Corp., Ltd., Shandong (CN)

(72) Inventors: Shifang Song, Shandong (CN); Li Guo, Shandong (CN); Yongfu Cheng, Shandong (CN)

(73) Assignee: Qingdao Haier Air Conditioner General Corp., Ltd., Shandong (CN)

( * ) Notice: Subject to any disclaimer, the term of this patent is extended or adjusted under 35 U.S.C. 154(b) by 0 days.

(21) Appl. No.: 16/461,704

(22) PCT Filed: Mar. 2, 2018

(86) PCT No.: PCT/CN2018/077924
§ 371 (c)(1),
(2) Date: May 16, 2019

(87) PCT Pub. No.: WO2018/177076
PCT Pub. Date: Oct. 4, 2018

(65) Prior Publication Data
US 2019/0360710 A1 Nov. 28, 2019

(30) Foreign Application Priority Data
Apr. 1, 2017 (CN) .......................... 2017 1 0213740

(51) Int. Cl.
*F24F 11/46* (2018.01)
*F24F 11/61* (2018.01)
(Continued)

(52) U.S. Cl.
CPC .............. *F24F 11/46* (2018.01); *F24F 11/61* (2018.01); *F24F 11/64* (2018.01); *F24F 11/65* (2018.01);
(Continued)

(58) Field of Classification Search
CPC .. F24F 11/30; F24F 11/46; F24F 11/61; F24F 11/62; F24F 11/64; F24F 11/65; F24F 2110/10; G05B 19/042; G05B 2219/2614
See application file for complete search history.

(56) References Cited

U.S. PATENT DOCUMENTS 4,657,179 A * 4/1987 Aggers ............. G05D 23/1905
236/51
9,157,646 B2 * 10/2015 Anderson ................ F24F 11/30
(Continued)

FOREIGN PATENT DOCUMENTS

CN 103344028 A 10/2013
CN 203364349 U 12/2013
(Continued)

OTHER PUBLICATIONS

Office Action from Chinese Application No. 201710213740.7 dated Mar. 26, 2019.
(Continued)

*Primary Examiner* — Abdelmoniem I Elamin
(74) *Attorney, Agent, or Firm* — Marshall, Gerstein & Borun LLP (57) ABSTRACT

Provided are a method and device for controlling an air conditioner. The method comprises: acquiring a current indoor temperature in an air conditioner control region and an initial user-set temperature of the air conditioner; and adjusting the initial user-set temperature when an indoor temperature is detected to meet a preset condition, energy consumption corresponding to the adjusted set temperature being lower than energy consumption corresponding to the initial user-set temperature. The method reduces power consumption of the air conditioner while ensuring that the temperature of the air conditioner is basically in line with expectations.

8 Claims, 3 Drawing Sheets

(51) Int. Cl.
  F24F 11/64    (2018.01)
  F24F 11/65    (2018.01)
  G05B 19/042   (2006.01)
  F24F 110/10   (2018.01)
(52) U.S. Cl.
  CPC ........ *G05B 19/042* (2013.01); *F24F 2110/10* (2018.01); *G05B 2219/2614* (2013.01)

(56) References Cited

U.S. PATENT DOCUMENTS

| | | | | |
|---|---|---|---|---|
| 10,559,045 | B2* | 2/2020 | Bentz | G06F 3/017 |
| 2010/0243231 | A1 | 9/2010 | Rosen | |
| 2012/0061068 | A1* | 3/2012 | Anderson | F24F 11/30 |
| | | | | 165/254 |
| 2012/0091213 | A1* | 4/2012 | Altonen | H05B 47/10 |
| | | | | 236/51 |
| 2012/0123594 | A1* | 5/2012 | Finch | G05D 23/1923 |
| | | | | 700/278 |
| 2012/0296480 | A1* | 11/2012 | Raman | G05B 13/026 |
| | | | | 700/277 |
| 2013/0268126 | A1* | 10/2013 | Iwami | F24F 11/30 |
| | | | | 700/276 |
| 2016/0290672 | A1* | 10/2016 | Arensmeier | F24F 11/30 |
| 2017/0076263 | A1* | 3/2017 | Bentz | G06F 3/04847 |
| 2018/0058710 | A1* | 3/2018 | Lewis | F24F 11/62 |

FOREIGN PATENT DOCUMENTS

| | | |
|---|---|---|
| CN | 103868196 A | 6/2014 |
| CN | 104456824 A | 3/2015 |
| CN | 104764162 A | 7/2015 |
| CN | 106885344 A | 6/2017 |
| EP | 2072922 A1 | 6/2009 |
| EP | 3040633 A1 | 7/2016 |
| JP | 2000146255 A | 5/2000 |
| JP | 2001235197 A | 8/2001 |
| JP | 2013088087 A | 5/2013 |
| KR | 20160116371 A | 10/2016 |

OTHER PUBLICATIONS

Office Action from Chinese Application No. 2017102137407 dated Jan. 19, 2020.
International Search Report from PCT/CN2018/077924 dated Dec. 11, 2019.
International Search Report from PCT/CN2018/077924 dated May 30, 2018.
Office Action from Chinese Application No. 201710213740.7 dated Aug. 23, 2019.
Written Opinion from International Application No. PCT/CN2018/077924 dated May 30, 2018.

\* cited by examiner

METHOD AND DEVICE FOR CONTROLLING AIR CONDITIONER

The present application is proposed based on China patent application No. 201710213740.7, filed on Apr. 1, 2017, and claims priority to the China patent application, the entire contents of which are hereby incorporated by reference.

TECHNICAL FIELD

The present disclosure relates to the technical field of air conditioners, and more particularly relates to a method and a device for controlling an air conditioner.

BACKGROUND

Currently, people have increasingly improved requirements for work, life and study environments. Regardless of the weather, people always want to be in a comfortable environment. Therefore, an air conditioner is applied more and more widely, and gradually becomes one of indispensable important equipment in people's daily life. However, the air conditioner brings huge power consumption while improving and enhancing the quality of office or living environments. Therefore, more and more attention is paid to air conditioner energy saving. In recent years, according to statistics, nearly 20 provinces and cities have experienced power shortage, and some places even have taken the measure of power limit for the power shortage. Although power consumption is saved to a certain extent, the "one-size-fits-all" measure of power limit limits the function of the air conditioner, fails to meet different needs of different users and hinders the application of the air conditioner.

SUMMARY

Embodiments of the present disclosure provide a method and a device for controlling an air conditioner. In order to basically understand some aspects of the disclosed embodiments, a brief summary is given below. The summary is not a general comment, nor tends to determine key/critical constituent elements or describe a protection scope of these embodiments, and only aims to present some concepts in a simplified form as an introduction of the following detailed description.

According to a first aspect of an embodiment of the present disclosure, a method for controlling an air conditioner is provided, including:

acquiring an indoor temperature in an air conditioner control region and an initial user-set temperature of the air conditioner; and adjusting the initial user-set temperature when the indoor temperature meets a preset condition, energy consumption corresponding to the adjusted set temperature being lower than energy consumption corresponding to the initial user-set temperature.

Optionally, when the air conditioner is operated in a heating mode, the preset condition includes: the indoor temperature is greater than or equal to a first temperature value; and the adjusted set temperature is lower than the initial user-set temperature.

When the initial user-set temperature is greater than a second temperature value, the initial user-set temperature is adjusted to the second temperature value; and when the initial user-set temperature is less than or equal to the second temperature value, the initial user-set temperature is reduced so that the adjusted set temperature is greater than or equal to the first temperature value.

Optionally, when the air conditioner is operated in a refrigeration mode, the preset condition includes: the indoor temperature is less than or equal to the first temperature value; and the adjusted set temperature is higher than the initial user-set temperature.

Optionally, a step of adjusting the initial user-set temperature includes:

when the initial user-set temperature is less than the second temperature value, the initial user-set temperature is adjusted to the second temperature value; and when the initial user-set temperature is greater than or equal to the second temperature value, the initial user-set temperature is increased so that the adjusted set temperature is less than or equal to the first temperature value.

Optionally, the method further includes:

recording a starting time of the air conditioner; and continuously acquiring the indoor temperature and the initial user-set temperature from a current time if an interval between the current time and the starting time is a preset time.

Optionally, the method further includes:

generating an adjusting command according to the initial user-set temperature, wherein the adjusting instruction includes the adjusted set temperature; and sending the adjusting instruction to the air conditioner.

Optionally, the method further includes:

detecting whether there is a user intervention instruction after sending the adjusting instruction to the air conditioner, wherein the user intervention instruction is an instruction to change the adjusted set temperature by the user; and updating a user intervention parameter when detecting the user intervention instruction, wherein the user intervention parameter is used for indicating the number of times of detecting the user intervention instruction.

Optionally, the method further includes:

stopping adjusting the initial user-set temperature when the user intervention parameter is greater than or equal to a preset threshold value.

According to a second aspect of an embodiment of the present disclosure, a device for controlling an air conditioner is provided, including:

an acquiring module configured to acquire an indoor temperature in an air conditioner control region and an initial user-set temperature of the air conditioner; and an adjusting module configured to adjust the initial user-set temperature acquired by the acquiring module when the indoor temperature acquired by the acquiring module meets a preset condition, energy consumption corresponding to the adjusted set temperature being lower than energy consumption corresponding to the initial user-set temperature.

The technical solution provided by the embodiment of the present disclosure may include the following beneficial effects:

A method and a device for controlling an air conditioner are provided by the present disclosure. The method includes: acquiring a current indoor temperature in an air conditioner control region and an initial user-set temperature of the air conditioner; and adjusting the initial user-set temperature when the indoor temperature is detected to meet a preset condition, energy consumption corresponding to the adjusted set temperature being lower than energy consumption corresponding to the initial user-set temperature. The initial user-set temperature is an expected air conditioner temperature which is set by a user according to the need, thereby embodying the need of the user. The air conditioner is adjusted based on the user-set temperature, thereby reducing power consumption of the air conditioner while ensuring that the temperature of the air conditioner is basically in line with expectations.

It should be understood that the above general description and the following detailed description are merely exemplary and illustrative and not restrictive to the present disclosure.

BRIEF DESCRIPTION OF THE DRAWINGS

The accompanying drawings herein, which are incorporated in the description and constitute a part of the description, illustrate embodiments consistent with the present disclosure and serve to explain principles of the present disclosure together with the description.

DETAILED DESCRIPTION

The following description and accompanying drawings fully illustrate specific embodiments of the present disclosure so that those skilled in the art can practice the specific embodiments. The embodiments only represent possible variations. Individual components and functions are optional unless explicitly required, and a sequence of operations is variable. Parts and features of some embodiments may be included in or substituted for parts and features of other embodiments. A scope of the embodiments of the present disclosure includes a full scope of claims and available equivalents of the claims. In this description, various embodiments may be individually or generally represented by a term "disclosure" for convenience only. If more than one disclosure is actually disclosed, the scope of the application is not automatically limited to any individual disclosure or inventive concept. In this description, relational terms such as first, second, etc. are only used to distinguish one entity or operation from another entity or operation, and do not require or imply any actual relationship or order among these entities or operations. Moreover, the terms such as "include", "contain" or any other variation thereof are intended to cover non-exclusive inclusions, such that a process, method or apparatus including a series of elements not only includes those elements, but also includes other elements not explicitly listed. Each embodiment herein is described in a progressive manner, and focuses on illustrating differences from other embodiments. Same and similar parts of the various embodiments can be referred to each other. Structures, products and the like disclosed in the embodiments correspond to the parts disclosed in the embodiments, and thus are described relatively simply; and the relevant parts refer to the descriptions of the method.

Figure 1:
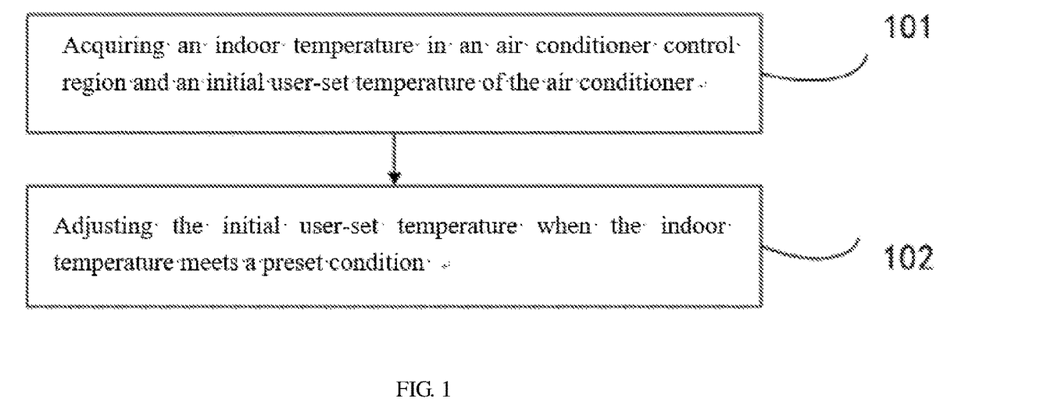
FIG. 1 is a flow chart of a method for controlling an air conditioner shown according to an exemplary embodiment.

For the convenience of understanding, as shown in FIG. 1, a method for controlling an air conditioner provided by the present disclosure includes:

In step 101, a current indoor temperature in an air conditioner control region and an initial user-set temperature of the air conditioner are acquired.

The initial user-set temperature is an expected air conditioner temperature which is set by a user according to the need, and is a holding temperature of the air conditioner set by the user according to the habit, thereby embodying the need of the user.

In step 102, the initial user-set temperature is adjusted when the indoor temperature meets a preset condition.

After the air conditioner is adjusted, the temperature of the air conditioner corresponds to a first adjusted set temperature and energy consumption corresponding to the adjusted set temperature is lower than energy consumption corresponding to the initial user-set temperature.

A method for controlling an air conditioner provided by the present disclosure includes: the initial user-set temperature is adjusted after the current indoor temperature in the air conditioner control region and the initial user-set temperature of the air conditioner are acquired and the indoor temperature is detected to meet the preset condition; and energy consumption corresponding to the adjusted set temperature is lower than energy consumption corresponding to the initial user-set temperature. The initial user-set temperature is an expected air conditioner temperature which is set by the user according to the need, thereby embodying the need of the user. The air conditioner is adjusted based on the user-set temperature, thereby reducing power consumption of the air conditioner while ensuring that the temperature of the air conditioner is basically in line with expectations.

In practical realization, since the air conditioner does not immediately reach the adjusting condition when just started, the starting time of the air conditioner can be recorded. The indoor temperature and the initial user-set temperature are continuously acquired from a current time if an interval between the current time and the starting time is a preset time, so as to reduce data transmission. The preset time can be obtained through data statistics, and is determined through a time required for the air conditioner to reach the indoor temperature that meets the preset condition from an initial indoor temperature at the starting time.

In practical application of the air conditioner, due to the differences of the outside environments, people have different functional requirements for the air conditioner. For example, in winter, the heating mode of the air conditioner is started by the user, and the air conditioner is initially turned on and adjusted to the set temperature by the user. The distribution of the set temperature is relatively discrete, and the proportions of temperatures such as 30° C., 26° C. and 28° C. are higher. For example, in order to acquire the setting habit of the user for the set temperature of the air conditioner, the user data of unheated cities in south China are counted in the heating season from December to February of the following year. By means of the statistical results of big data, it is found that the proportion of the use time of 30° C. is the highest, the use proportion of 26° C. is the second highest, and the use proportion of 28° C. is the third highest. However, dressing habits of the user are greatly different. In winter at home, the user may wear short-sleeved clothes, housecoat and cotton-padded clothes. Dressing is strongly related to the set temperature. Sometimes, the user firstly directly sets the set temperature as 30° C. However, after the indoor temperature is increased, the user can accept a lower set temperature. However, at this moment, the user often forgets to adjust the set temperature of the air conditioner, thereby causing energy waste.

In the heating season, user data is randomly selected for statistics. The selected data includes the indoor temperature of the region of the user, an outdoor temperature and the set temperature. The air conditioner of the user is operated for 79 days in the heating season, and the proportion of the set temperature which is greater than 26° C. is 97.6%. These statistical results are obtained through the curve data shown in FIG. 2 and FIG. 3, and then the user is extracted randomly with the same method to conduct data statistics to obtain basically the same result. Meanwhile, it is found that 27° C. is also acceptable even if the user sets the temperature at 30° C. Therefore, when the user sets a higher set temperature when starting the air conditioner, and the indoor temperature is increased, a lower set temperature is acceptable.

Figure 2:
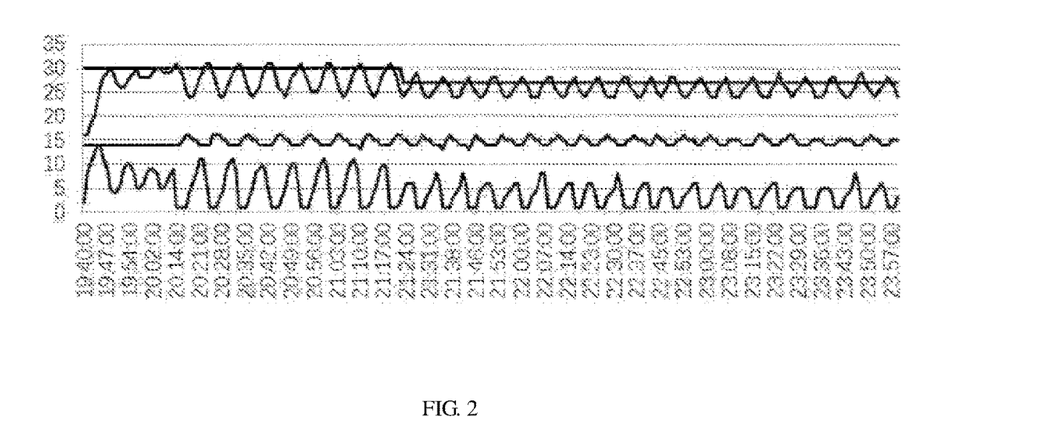
FIG. 2 is a curve chart of counting the use of an air conditioner of a user in one day in an embodiment of the present disclosure.

In the curve chart of FIG. 2, the use data of the air conditioner of a randomly selected user in any day in January is shown. In the curve chart, the change of the set temperature of the air conditioner, the indoor temperature, power and outdoor temperature which vary with time are involved. Data are recorded every 8 minutes from 19:40 to 23:52. Four curves in FIG. 2 are the set temperature, the indoor temperature, the outdoor temperature and the power from top to bottom according to the leftmost position. The set temperature is the initial set temperature of 30° C. There is a curve in which the linear indoor temperature with one transition in the middle is increased from 15° C. and finally tends to be consistent with the set temperature. There is a small-change curve in which the recorded initial temperature of the outdoor temperature is slightly lower than the indoor temperature. The power is indicated by a curve shown at the lowest part of FIG. 2. When the initial user-set temperature is decreased, the power also decreases.

Figure 3:
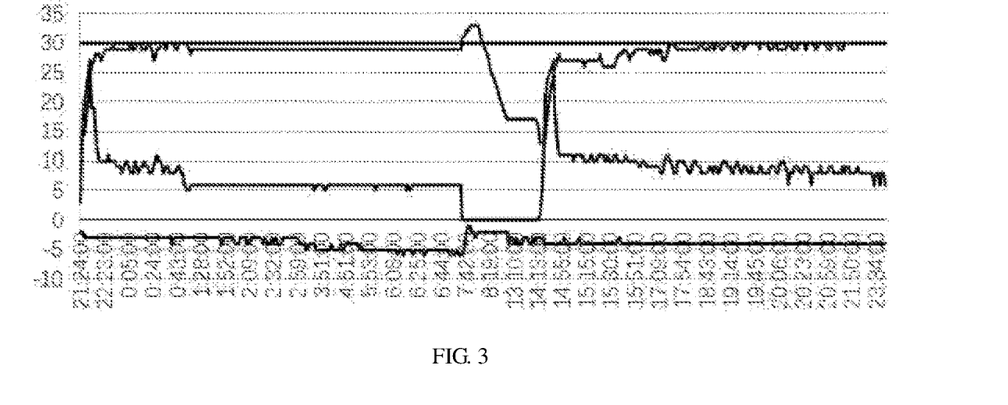
FIG. 3 is a curve chart of counting the use of an air conditioner of a user in another day in an embodiment of the present disclosure.

In the curve chart shown in FIG. 3, the use data of the air conditioner of the user in another day in FIG. 2 is shown. Involved parameters are the same as parameter types in FIG. 2. Four curves in FIG. 3 are the set temperature, the indoor temperature, the power and the outdoor temperature from top to bottom according to the leftmost position. The use of the air conditioner from 21:24 to 22:15 of the next day is recorded in FIG. 3. The set temperature, i.e., the initial set temperature of 30° C., is indicated by a straight line. The indoor temperature is indicated by a curve in which the indoor temperature is increased and then decreased and is consistent with the initial user-set temperature in some time periods. The power is indicated by a curve which is in negative correlation with the indoor temperature. The outdoor temperature is indicated by a curve at the lowest part of FIG. 3.

Correspondingly, the same problem exists in the refrigeration season, i.e., when the user needs the air conditioner for refrigeration in summer. The user generally sets a lower set temperature at first when turning on the air conditioner. After the indoor temperature is decreased, the user can actually accept a higher set temperature.

In combination with the above actual application, the method for controlling the air conditioner proposed by the present disclosure adjusts the above refrigeration condition and the heating condition respectively. The refrigeration condition and the heating condition will be respectively described below in combination with the embodiment shown in FIG. 1.

Firstly, the following is the condition that the air conditioner is operated in heating mode.

When heating adjustment is conducted on the air conditioner, the current mode of the air conditioner is judged at first. When the air conditioner is continuously started and is kept in the heating mode, a current indoor temperature and an initial user-set temperature are continuously acquired.

It should be indicated that, the involved air conditioner is continuously started and is kept in the heating mode, i.e., the condition of mode conversion of the air conditioner is excluded. For example, the air conditioner is firstly operated in a non-heating mode and then switched to the heating mode. Under this condition, heating adjustment is not conducted.

After the indoor temperature and the initial user-set temperature are acquired, condition judgment is needed.

When the indoor temperature is greater than or equal to a first temperature value, the indoor temperature is determined to meet a preset condition.

The first temperature value herein is a preset temperature, and is higher than outdoor temperature. The first temperature value may be 22° C., and is not limited by the present disclosure.

When the indoor temperature is determined to meet the condition, the initial user-set temperature is adjusted. The adjusted set temperature is lower than the initial user-set temperature. In this way, after adjustment, energy consumption of the air conditioner is reduced.

In the present disclosure, different initial user-set temperatures correspond to different adjustments. Because the initial user-set temperature is set by the user, the use habit of the user is embodied. Therefore, during adjustment, when the air conditioner is adjusted, the habit of the user is also considered and a different adjusting strategy is indicated according to the habit.

When the initial user-set temperature is greater than a second temperature value, the initial user-set temperature is adjusted to the second temperature value.

When the initial user-set temperature is less than or equal to the second temperature value, the initial user-set temperature is reduced so that the adjusted set temperature is greater than or equal to the first temperature value. Herein, the setting value of the initial user-set temperature may be decreased, and may be an integer greater than or equal to 1 as long as the adjusted temperature is greater than or equal to the first temperature value after the preset value of the initial user-set temperature is decreased.

In the heating mode, the second temperature value is greater than the first temperature value.

In combination with the above description, for example, the first temperature value of 22° C., the second temperature value of 27° C. and the set value of 1° C. are taken as an example. When the indoor temperature is greater than or equal to 22° C., if the initial user-set temperature is greater than 27° C., then adjustment is conducted according to high energy consumption standard. Namely, the initial user-set temperature is adjusted to the second temperature value, i.e., the initial user-set temperature is 27° C. if the initial user-set temperature is less than or equal to 27° C., then the initial user-set temperature is decreased by 1° C. according to ordinary energy consumption standard. Due to the heating mode, the current set temperature shall not be too low to avoid affecting user experience. The adjusted temperature herein shall not be too low. The present disclosure takes the following example that the adjusted temperature is not lower than the first temperature value, i.e., the second adjusted temperature value is 22° C. at minimum.

The above describes the heating mode of the air conditioner. The same problem exists when the air conditioner is operated in the refrigeration mode. In summer, although the dressing of the users is generally the same, there are large differences among different users in the setting of the air conditioner temperature. According to data statistics, when turning on the air conditioner, some users are accustomed to setting the air conditioner temperature to be very low, so as to reduce the indoor temperature as soon as possible. However, if the set temperature is not adjusted in time after the indoor temperature is reduced, not only energy consumption is wasted, but also the health of the user is harmed. Through a monitoring experiment of user data, the statistical result shows that 26° C. is a relatively comfortable temperature for a human body. During refrigeration adjustment, the present disclosure makes adjustment based on the suitable temperature of the human body. The adjustment process is as follows:

When the indoor temperature is less than or equal to the first temperature value, the indoor temperature is determined to meet a preset condition.

Although the first temperature value in the refrigeration mode has the same name as the first temperature value in the above described heating mode, actual values are different. The value of the first temperature value in the refrigeration mode is higher than value of the first temperature value in the heating mode. For example, the first temperature value may be 30° C.

When the indoor temperature meets the preset condition, the following adjustment is made to the initial user-set temperature:

When the initial user-set temperature is less than a second temperature value, the initial user-set temperature is adjusted to the second temperature value.

When the initial user-set temperature is greater than or equal to the second temperature value, the initial user-set temperature is increased so that the adjusted set temperature is less than or equal to the first temperature value. Herein, the setting value of the initial user-set temperature may be increased, and may be an integer greater than or equal to 1 as long as the adjusted temperature is greater than or equal to the first temperature value after the preset value of the initial user-set temperature is increased.

For example, in the refrigeration mode, it could be that the first temperature value is 30° C., the second temperature value is 26° C. and the setting value of the adjusted initial user-set temperature is 1° C.

In practical realization, the method for controlling the air conditioner involved in the present disclosure may indicate the operation of the air conditioner through a cloud platform server, and may also be executed through the air conditioner.

In the flow of the method shown in FIG. 1, the cloud platform server acquires the indoor temperature reported by the air conditioner and the initial user-set temperature. If the acquired indoor temperature meets the preset condition, an adjusting instruction is generated by combining with the initial user-set temperature. The adjusting instruction includes the adjusted set temperature, and then sends the adjusting instruction to the air conditioner, so that the air conditioner adjusts the initial user-set temperature according to the adjusted set temperature in the adjusting instruction after receiving the adjusting instruction. In combination with the above description, the adjusted set temperature may be the second temperature value, or a temperature after the set temperature is decreased or the preset value is increased. The first temperature value, the second temperature value and the preset value involved during adjustment are pre-stored in the cloud platform server.

The cloud platform server can also record the starting time reported by the air conditioner. After a preset time from the starting time, a request to acquire the indoor temperature and initial user-set temperature is sent to the air conditioner so as to acquire the data reported by the air conditioner. The cloud platform server can also detect the number of times of acquiring the user intervention instructions by the air conditioner and record a user intervention parameter. When the user intervention parameter is greater than or equal to a preset threshold value, adjustment of the air conditioner is stopped.

In another aspect, the method for controlling the air conditioner can also directly make adjustment without sending the adjusting instruction by means of the cloud platform server. The air conditioner can acquire the indoor temperature and the initial user-set temperature through an own processor, and can analyze whether the indoor temperatures meet the preset condition. When the indoor temperatures are determined to meet the condition, the air conditioner adjusting standard is determined according to the current initial user-set temperature, and a temperature adjusting component of the air conditioner is indicated to adjust the initial user-set temperature so that the air conditioner can keep the adjusted set temperature after adjustment.

Of course, although the entire control process can be executed by the air conditioner, the air conditioner can still report the data acquired by itself to the cloud platform server. The cloud platform server can analyze and count the use habits of the users according to these data and classify the users.

Regardless of the adjustment in the heating mode or the refrigeration mode, after executing the adjusting instruction, the air conditioner can also detect whether the users are satisfied with the adjustment result, so as to better satisfy the user experience. For this, if the adjusted air conditioner receives an instruction for the user to change the adjusted set temperature, it indicates that the set temperature after this adjustment is not a result expected by the user. In order to reduce this situation, after adjusting the air conditioner, the present disclosure also detects whether there is the user intervention instruction. When the user intervention instruction is detected, the user intervention parameter is updated. The user intervention parameter is used to indicate the number of times of detecting the user intervention instruction. The update of the user intervention parameter herein means that the user intervention parameter is added by 1 on the basis of the previous intervention parameter whenever a user intervention instruction is detected.

The updated user intervention parameter is recorded. If the user intervention parameter reaches the preset threshold value, the air conditioner is not adjusted in the process of starting the air conditioner.

In order to better enhance the user experience and the feedback of the user to the adjustment of the air conditioner, the air conditioner is only adjusted once during the starting. If energy-saving intervention is carried out during the day, the energy-saving intervention can still be carried out at night, which counts as one time.

Figure 4:
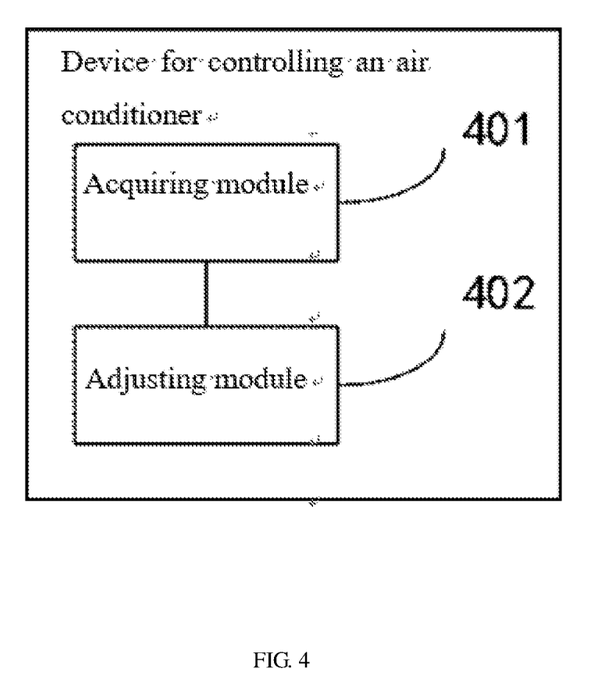
FIG. 4 is a block diagram of a device for controlling an air conditioner shown according to an exemplary embodiment.

As shown in FIG. 4, FIG. 4 is a block diagram of a device for controlling an air conditioner shown according to the present disclosure. The device may be arranged in the air conditioner or the platform server. The device includes: an acquiring module 401 and an adjusting module 402.

The acquiring module 401 is used for acquiring an indoor temperature in an air conditioner control region and an initial user-set temperature of the air conditioner.

The adjusting module 402 is configured to adjust the initial user-set temperature acquired by the acquiring module 402 when the indoor temperature acquired by the acquiring module 401 meets a preset condition.

Energy consumption corresponding to the set temperature adjusted by the acquiring module 402 is lower than energy consumption corresponding to the initial user-set temperature.

In combination with the device shown in FIG. 4, when the air conditioner is operated in the heating mode, the preset condition includes: the indoor temperature is greater than or equal to a first temperature value; and the adjusted set temperature is lower than the initial user-set temperature.

In the device for controlling the air conditioner provided by the present disclosure, the current indoor temperature in the air conditioner control region and the initial user-set temperature of the air conditioner are acquired through the acquiring module; and the initial user-set temperature is adjusted when the indoor temperature is detected to meet a preset condition, energy consumption corresponding to the adjusted set temperature being lower than energy consumption corresponding to the initial user-set temperature. The initial user-set temperature is an expected air conditioner temperature which is set by a user according to the need, thereby embodying the need of the user. The air conditioner is adjusted based on the user-set temperature, thereby reducing power consumption of the air conditioner while ensuring that the temperature of the air conditioner is basically in line with expectations.

In the heating module, the adjusting module 402 is also configured to adjust the initial user-set temperature to the second temperature value when the initial user-set temperature is greater than a second temperature value; or reduce the initial user-set temperature when the initial user-set temperature is less than or equal to the second temperature value.

The set temperature adjusted by the adjusting module 402 is greater than or equal to the first temperature value.

In combination with the device shown in FIG. 4, when the air conditioner is operated in the refrigeration mode, the preset condition includes: the indoor temperature is less than or equal to the first temperature value; and the adjusted set temperature is higher than the initial user-set temperature.

In the refrigeration mode, the adjusting module 402 is also configured to adjust the initial user-set temperature to the second temperature value when the initial user-set temperature is less than the second temperature value; or increase the initial user-set temperature when the initial user-set temperature is greater than or equal to the second temperature value, so that the adjusted set temperature is less than or equal to the first temperature value.

In a possible configuration of the device for controlling the air conditioner, the acquiring module 401 includes: a recording submodule 4011 and an acquiring submodule 4012.

The recording submodule 4011 is used for recording the starting time of the air conditioner.

The acquiring submodule 4012 is used for continuously acquiring the indoor temperature and the initial user-set temperature from a current time if an interval between the current time and the starting time is a preset time.

In another possible configuration of the device for controlling the air conditioner, the adjusting module 402 includes: an instruction generating submodule 4021 and an instruction sending submodule 4022.

The instruction generating submodule 4021 is used for generating an adjusting instruction according to the initial user-set temperature.

The adjusting instruction includes the adjusted set temperature.

The instruction sending submodule 4022 is used for sending the adjusting instruction generated by the instruction generating submodule 4021 to the air conditioner.

The air conditioner adjusts the initial user-set temperature according to the adjusted set temperature.

When the adjusting module 402 is configured on the cloud platform server, the above instruction generating submodule 4021 and the instruction sending submodule 4022 included in the adjusting module configure the above functions on the cloud platform server.

When the adjusting module is configured in the air conditioner, the adjusting module may include the instruction generating submodule used for generating the adjusting instruction according to the initial user-set temperature, and include the instruction sending submodule used for sending the adjusting instruction to the temperature adjusting component in the air conditioner. The instruction may be not generated, and the adjustment mode of the air conditioner can be determined directly according to the initial user-set temperature. For example, according to the above second temperature value or the adjustment made to the preset value of the initial user-set temperature, the initial user-set temperature is adjusted directly according to the determined adjusting value.

In another possible configuration of the device for controlling the air conditioner, the device for controlling the air conditioner further includes:

a detection intervention module 403 used for detecting whether there is a user intervention instruction after sending the adjusting instruction to the air conditioner, wherein the user intervention instruction is an instruction to change the adjusted set temperature by the user; and a parameter update module 404 used for updating a user intervention parameter when detecting the user intervention instruction, wherein the user intervention parameter is used for indicating the number of times of detecting the user intervention instruction.

The detection intervention module 403 and the parameter update module 404 in the device can be configured in the air conditioner or in the cloud platform server. When the detection intervention module 403 is configured in the air conditioner, the detection intervention module 403 detects whether there is a user intervention instruction inputted by the user. When the detection intervention module 403 is configured in the cloud platform server, the detection intervention module 403 detects whether there is a user intervention instruction reported by the air conditioner. The device for controlling the air conditioner can also stop adjusting the initial user-set temperature when the user intervention parameter is greater than or equal to a preset threshold value.

Figure 5:
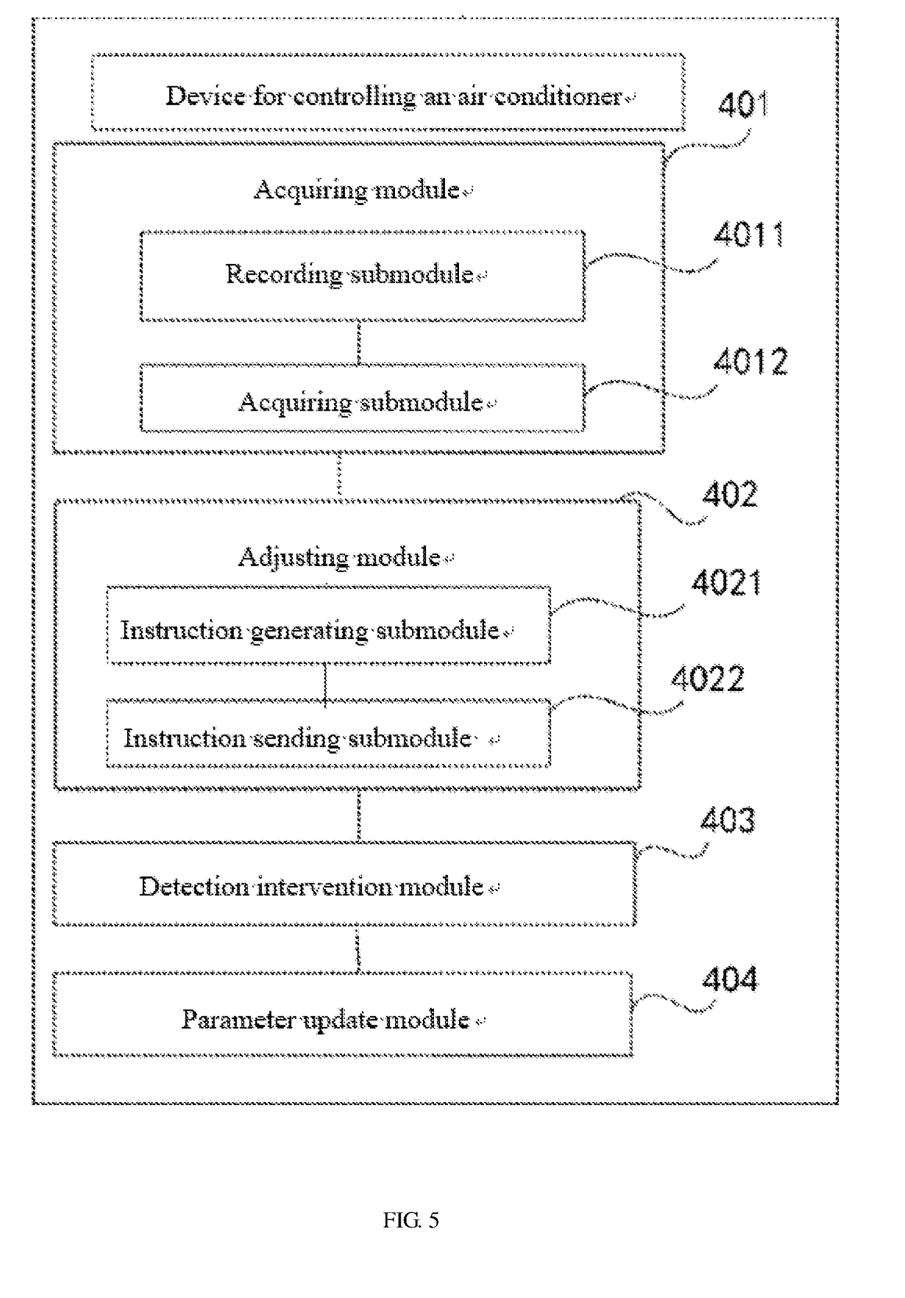
FIG. 5 is a block diagram of a device for controlling an air conditioner shown according to an exemplary embodiment.

In order to clearly show the structure of the device for controlling the air conditioner, the present disclosure shows a schematic structure of the device for controlling the air conditioner in FIG. 5. FIG. 5 provides illustration by taking an example that the device is configured in the cloud platform server. The device for controlling the air conditioner includes: the acquiring module 401, the adjusting module 402, the detection intervention module 403 and the parameter update module 404, wherein the acquiring module 401 includes: the recording submodule 4011 and the acquiring submodule 4012 and the adjusting module 402 includes: the instruction generating submodule 4021 and the instruction sending submodule 4022. Specific configuration of the related modules is described above.

Those skilled in the art can clearly understand that, for the convenience and simplicity of the description, only the division of the above functional modules is taken as an example for description. In practical application, the above functions can be assigned by different functional modules as required, i.e., the internal structure of the device is divided into different functional modules to complete all or part of the functions described above. The specific working process of the system, the device and the unit described above can be found in the corresponding process in the method embodiment mentioned above, and will not be repeated herein.

It should be understood that the present disclosure is not limited to the processes and structures described above and shown in the accompanying drawings, and can be subjected to various modifications and changes without departing from the scope thereof. The scope of the present disclosure is limited only by appended claims.

The invention claimed is:

1. A method for controlling an air conditioner, the method comprising:
acquiring an indoor temperature in an air conditioner control region and an initial user-set temperature of the air conditioner; and
adjusting the initial user-set temperature when the indoor temperature meets a preset condition, wherein energy consumption corresponding to the adjusted set temperature being lower than energy consumption corresponding to the initial user-set temperature,
wherein when the air conditioner is operated in a heating mode, the preset condition comprises the indoor temperature is greater than or equal to a first temperature value and the adjusted set temperature is lower than the initial user-set temperature, and
wherein the adjusting the initial user-set temperature comprises,
  adjusting, when the initial user-set temperature is greater than a second temperature value, the initial user-set temperature to the second temperature value, and
  reducing the initial user-set temperature when the initial user-set temperature is less than or equal to the second temperature value, wherein the adjusted set temperature is greater than or equal to the first temperature value.

2. The method according to claim 1, wherein when the air conditioner is operated in a refrigeration mode, the preset condition comprises: the indoor temperature is less than or equal to the first temperature value; and the adjusted set temperature is higher than the initial user-set temperature.

3. The method according to claim 2, wherein the adjusting the initial user-set temperature comprises:
adjusting the initial user-set temperature to the second temperature value when the initial user-set temperature is less than the second temperature value; and
increasing the initial user-set temperature when the initial user-set temperature is greater than or equal to the second temperature value, wherein the adjusted set temperature is less than or equal to the first temperature value.

4. The method according to claim 1, further comprising:
recording a starting time of the air conditioner; and
continuously acquiring the indoor temperature and the initial user-set temperature from a current time when an interval between the current time and the starting time is a preset time.

5. The method according to claim 1, further comprising:
generating an adjusting command according to the initial user-set temperature, wherein the adjusting instruction comprises the adjusted set temperature; and
sending the adjusting instruction to the air conditioner.

6. The method according to claim 5, further comprising:
detecting whether there is a user intervention instruction after sending the adjusting instruction to the air conditioner, wherein the user intervention instruction is an instruction to change the adjusted set temperature by the user; and
updating a user intervention parameter when the user intervention instruction is detected, wherein the user intervention parameter is used for indicating a number of times of detecting the user intervention instruction.

7. The method according to claim 6, further comprising:
stopping adjusting the initial user-set temperature when the user intervention parameter is greater than or equal to a preset threshold value.

8. A device for controlling an air conditioner, comprising:
an acquiring module, configured to acquire an indoor temperature in an air conditioner control region, and an initial user-set temperature of the air conditioner; and
an adjusting module, configured to adjust the initial user-set temperature acquired by the acquiring module when the indoor temperature acquired by the acquiring module meets a preset condition, wherein energy consumption corresponding to the adjusted set temperature being lower than energy consumption corresponding to the initial user-set temperature,
wherein when the air conditioner is operated in a heating mode, the preset condition comprises the indoor temperature is greater than or equal to a first temperature value and the adjusted set temperature is lower than the initial user-set temperature, and
the adjusting module is further configured to adjust, when the initial user-set temperature is greater than a second temperature value, the initial user-set temperature to the second temperature value; and to reduce the initial user-set temperature when the initial user-set temperature is less than or equal to the second temperature value, wherein the adjusted set temperature is greater than or equal to the first temperature value.

* * * * *